US012650220B2

(12) United States Patent
Baker et al.

(10) Patent No.: US 12,650,220 B2
(45) Date of Patent: Jun. 9, 2026

(54) JAMMING RESISTANT AUGER FOR COOKER

(71) Applicant: GMG Products, LLC, Lakeside, OR (US)

(72) Inventors: Jason Baker, Scottsdale, AZ (US); David W. Baker, Lakeside, OR (US); Wang Ping, Wuhan (CN)

(73) Assignee: GMG Products, LLC, Lakeside, OR (US)

( * ) Notice: Subject to any disclaimer, the term of this patent is extended or adjusted under 35 U.S.C. 154(b) by 0 days.

(21) Appl. No.: 18/822,179

(22) Filed: Aug. 31, 2024

(65) Prior Publication Data

US 2025/0075901 A1     Mar. 6, 2025

Related U.S. Application Data

(60) Provisional application No. 63/640,706, filed on Apr. 30, 2024, provisional application No. 63/535,840, filed on Aug. 31, 2023.

(51) Int. Cl.
  *F23B 40/08*         (2006.01)
  *A47J 37/07*         (2006.01)
  (Continued)

(52) U.S. Cl.
  CPC ........... *F23B 40/08* (2013.01); *A47J 37/0704* (2013.01); *F23K 3/14* (2013.01); *F24B 13/04* (2013.01); *F23K 2203/202* (2013.01)

(58) Field of Classification Search
  None
  See application file for complete search history.

(56) References Cited

U.S. PATENT DOCUMENTS 100,410 A     3/1870  Hull
103,736 A     5/1870  Gregory
           (Continued)

FOREIGN PATENT DOCUMENTS

AT          411098       9/2003
CN       201794520 U     4/2011
           (Continued)

OTHER PUBLICATIONS

International Preliminary Report on Patentability dated May 17, 2022, in International Patent Application No. PCT/US2020/062211, 9 pages.

(Continued)

*Primary Examiner* — Jason Lau
(74) *Attorney, Agent, or Firm* — Lowe Graham Jones PLLC

(57)          ABSTRACT

The present invention relates to an improved auger system for delivering combustible material to a burn box within a cooker, such as a grill or smoker. The invention features a pivotable coupling between the auger shaft and the drive motor, enabling the auger to adjust its alignment within the tube to accommodate irregularly shaped materials, thus minimizing jamming and improving the consistency of material delivery. In some embodiments, the system also incorporates a mechanism to prevent material bridging in the hopper, ensuring the continuous flow of material into the auger tube as well as an auger cover flap pivotably mounted at the outlet end of an auger tube, which is configured to control the flow of combustible material from the auger tube into the burn box.

24 Claims, 10 Drawing Sheets

(51) Int. Cl.
    *F23K 3/14*          (2006.01)
    *F24B 13/04*         (2006.01)

(56)                References Cited

U.S. PATENT DOCUMENTS

| | | | |
|---|---|---|---|
| 119,169 | A | 9/1871 | Ogden |
| 161,577 | A | 3/1875 | Thomas |
| 382,886 | A | 5/1888 | Lee |
| 1,038,420 | A | 9/1912 | Newcomer et al. |
| 1,433,062 | A | 10/1922 | Bellamy |
| RE16,011 | E | 3/1925 | Simon |
| 1,650,634 | A | 11/1927 | Lutzler |
| 1,755,674 | A | 4/1930 | Tauriainen |
| 1,919,407 | A | 7/1933 | Wood |
| 1,938,565 | A | 12/1933 | Anderson |
| 1,960,778 | A | 5/1934 | Goss et al. |
| 2,068,018 | A | 1/1937 | Goetz |
| 2,354,240 | A | 7/1944 | Young et al. |
| 2,365,679 | A | 12/1944 | Casey |
| 2,620,970 | A | 12/1952 | Palmer et al. |
| 2,641,085 | A | 6/1953 | Robinson et al. |
| 2,833,363 | A | 5/1958 | Henehan |
| 2,997,566 | A | 8/1961 | Pierce et al. |
| 3,021,386 | A | 2/1962 | Clark |
| 3,073,263 | A | 1/1963 | Wynkoop |
| 3,307,506 | A | 3/1967 | Rose |
| 3,327,698 | A | 6/1967 | Leslie |
| 3,384,066 | A | 5/1968 | Tufts |
| 3,413,935 | A | 12/1968 | Behrns |
| 3,453,975 | A | 7/1969 | Gunter |
| 3,474,725 | A | 10/1969 | McClaren |
| 3,586,518 | A | 6/1971 | Folmar |
| 3,600,969 | A * | 8/1971 | Pitner ..................... F16D 3/385 |
| | | | 464/131 |
| 3,609,236 | A | 9/1971 | Heilman |
| 3,739,732 | A | 6/1973 | Graham |
| 3,742,839 | A | 7/1973 | Maley |
| 3,745,303 | A | 7/1973 | Epperson et al. |
| 3,765,397 | A | 10/1973 | Henderson |
| 3,814,005 | A | 6/1974 | Widdel |
| 3,838,249 | A | 9/1974 | Detterbeck |
| 3,903,866 | A | 9/1975 | Polinski |
| 3,934,520 | A | 1/1976 | Brennan et al. |
| 4,020,322 | A | 4/1977 | Muse |
| 4,094,295 | A | 6/1978 | Boswell et al. |
| 4,094,649 | A | 6/1978 | Osterried |
| 4,227,510 | A | 10/1980 | Frazier et al. |
| 4,241,650 | A | 12/1980 | John et al. |
| 4,334,462 | A | 6/1982 | Hefling |
| 4,374,489 | A | 2/1983 | Robbins |
| 4,395,958 | A | 8/1983 | Caffyn et al. |
| 4,401,017 | A | 8/1983 | Feld |
| D270,987 | S | 10/1983 | Scheufler |
| 4,413,609 | A | 11/1983 | Tisdale |
| 4,417,565 | A | 11/1983 | Karpinia |
| 4,454,805 | A | 6/1984 | Matthews |
| 4,481,408 | A | 11/1984 | Scheufler |
| 4,491,722 | A | 1/1985 | Fischer et al. |
| 4,495,860 | A | 1/1985 | Hitch et al. |
| 4,503,835 | A | 3/1985 | Williams |
| 4,508,094 | A | 4/1985 | Hait |
| 4,509,412 | A | 4/1985 | Whittenburg et al. |
| 4,510,916 | A | 4/1985 | Ogden |
| 4,512,249 | A | 4/1985 | Mentzel |
| 4,531,505 | A | 7/1985 | Hait et al. |
| 4,531,507 | A | 7/1985 | Gerson |
| 4,539,973 | A | 9/1985 | Hait |
| 4,554,864 | A | 11/1985 | Smith et al. |
| 4,574,776 | A | 3/1986 | Hidle |
| 4,587,947 | A | 5/1986 | Tomita |
| 4,591,698 | A | 5/1986 | Chang |
| 4,603,679 | A | 8/1986 | Ogden |
| 4,624,238 | A | 11/1986 | Hait |
| 4,626,352 | A | 12/1986 | Massey et al. |
| 4,628,351 | A | 12/1986 | Heo |
| 4,638,787 | A | 1/1987 | Tyson |
| 4,706,643 | A | 11/1987 | Tyson |
| 4,711,979 | A | 12/1987 | Glasser et al. |
| 4,714,013 | A | 12/1987 | Telfer |
| 4,721,037 | A | 1/1988 | Blosnich |
| 4,762,056 | A | 8/1988 | Virag |
| 4,788,905 | A | 12/1988 | Von Kohorn |
| 4,803,921 | A | 2/1989 | Nuss |
| 4,867,050 | A | 9/1989 | Patenaude et al. |
| 4,877,010 | A | 10/1989 | Hait |
| 4,909,235 | A | 3/1990 | Boetcker |
| 4,909,237 | A | 3/1990 | Karpinia |
| 4,910,372 | A | 3/1990 | Vukich |
| 4,938,202 | A | 7/1990 | Hait |
| 4,958,578 | A | 9/1990 | Houser |
| 4,962,696 | A | 10/1990 | Gillis |
| 4,976,252 | A | 12/1990 | Cianciola |
| 4,987,827 | A | 1/1991 | Marquez |
| 5,070,777 | A | 12/1991 | Novak |
| 5,086,752 | A | 2/1992 | Hait |
| 5,094,223 | A | 3/1992 | Gonzalez |
| 5,094,280 | A | 3/1992 | Kahilahti et al. |
| 5,097,817 | A | 3/1992 | Dodgen |
| 5,123,360 | A | 6/1992 | Burke et al. |
| 5,154,159 | A | 10/1992 | Knafelc et al. |
| 5,167,183 | A | 12/1992 | Schlosser et al. |
| 5,168,796 | A | 12/1992 | Porton et al. |
| 5,172,682 | A | 12/1992 | Luebke et al. |
| 5,176,067 | A | 1/1993 | Higgins |
| 5,176,124 | A | 1/1993 | Wrasse |
| 5,185,047 | A | 2/1993 | Ray |
| D333,941 | S | 3/1993 | Hait |
| 5,195,423 | A | 3/1993 | Beller |
| 5,197,379 | A | 3/1993 | Leonard, Jr. |
| 5,197,455 | A | 3/1993 | Tessien |
| 5,218,950 | A | 6/1993 | Hait |
| 5,253,634 | A | 10/1993 | LeBeouf |
| 5,269,286 | A | 12/1993 | Cowan |
| 5,276,307 | A | 1/1994 | Higgins |
| 5,287,799 | A | 2/1994 | Pickering et al. |
| 5,313,877 | A | 5/1994 | Holland |
| D347,548 | S | 6/1994 | Boehm et al. |
| 5,359,988 | A | 11/1994 | Hait |
| 5,425,352 | A | 6/1995 | Gillam et al. |
| 5,437,222 | A | 8/1995 | Franklin |
| 5,469,835 | A | 11/1995 | Stephen et al. |
| 5,473,980 | A | 12/1995 | Carpenter |
| 5,495,845 | A | 3/1996 | Hait |
| 5,516,009 | A | 5/1996 | Kautz |
| 5,517,902 | A | 5/1996 | Boston |
| 5,524,610 | A | 6/1996 | Clark |
| 5,528,984 | A | 6/1996 | Saurwein |
| D376,510 | S | 12/1996 | Ting |
| 5,586,488 | A | 12/1996 | Liu |
| 5,605,092 | A | 2/1997 | Riccio |
| 5,617,778 | A | 4/1997 | Schroeter et al. |
| D379,900 | S | 6/1997 | Gillam et al. |
| 5,649,477 | A | 7/1997 | Lingwood |
| 5,655,435 | A | 8/1997 | Rachesky |
| 5,687,704 | A | 11/1997 | Lerch et al. |
| 5,775,315 | A | 7/1998 | Baykal |
| 5,797,386 | A | 8/1998 | Orr |
| 5,809,871 | A | 9/1998 | Arathoon |
| 5,809,991 | A | 9/1998 | Pai |
| 5,821,507 | A | 10/1998 | Sasaki et al. |
| 5,884,006 | A | 3/1999 | Frohlich et al. |
| 5,891,498 | A | 4/1999 | Boehler |
| D411,407 | S | 6/1999 | Anthony |
| 5,957,038 | A | 9/1999 | Shimazaki |
| 6,035,770 | A | 3/2000 | Whitefield |
| 6,055,901 | A | 5/2000 | Gantos et al. |
| 6,058,832 | A | 5/2000 | Fountain |
| 6,065,464 | A | 5/2000 | Zajec |
| 6,065,466 | A | 5/2000 | Baykal |
| 6,076,515 | A | 6/2000 | Smith |
| 6,097,004 | A | 8/2000 | Seul |
| 6,103,291 | A | 8/2000 | Fernandez Tapia |
| 6,108,489 | A | 8/2000 | Frohlich et al. |
| 6,125,740 | A | 10/2000 | Hedrington et al. |

(56) References Cited

U.S. PATENT DOCUMENTS

| | | | |
|---|---|---|---|
| 6,161,534 | A | 12/2000 | Kronman |
| 6,167,799 | B1 | 1/2001 | Macias |
| 6,176,173 | B1 | 1/2001 | Holbrook et al. |
| 6,187,359 | B1 | 2/2001 | Zuccarini |
| D439,792 | S | 4/2001 | Hedrington et al. |
| 6,213,006 | B1 | 4/2001 | Reardon et al. |
| 6,223,737 | B1 | 5/2001 | Buckner |
| 6,229,563 | B1 | 5/2001 | Miller, II et al. |
| 6,263,786 | B1 | 7/2001 | Raio et al. |
| 6,289,795 | B1 | 9/2001 | McLemore et al. |
| 6,307,193 | B1 | 10/2001 | Toole |
| 6,314,868 | B1 | 11/2001 | Christensen et al. |
| 6,314,869 | B1 | 11/2001 | Bourgeois, Jr. |
| 6,425,388 | B1 | 7/2002 | Korinchock |
| 6,467,400 | B2 | 10/2002 | Raio et al. |
| 6,523,463 | B1 | 2/2003 | Hogle |
| 6,525,299 | B2 | 2/2003 | Hannon et al. |
| 6,546,849 | B1 | 4/2003 | Shimazaki |
| 6,568,314 | B1 | 5/2003 | Stepanova |
| 6,640,695 | B2 | 11/2003 | Stark |
| 6,675,794 | B1 | 1/2004 | Yang |
| 6,688,301 | B1 | 2/2004 | McNeill |
| 6,874,495 | B2 | 4/2005 | McFadden |
| 6,874,496 | B2 | 4/2005 | Waits et al. |
| 7,021,202 | B2 | 4/2006 | Sizer |
| 7,101,583 | B1 | 9/2006 | Bove |
| 7,107,983 | B1 | 9/2006 | West |
| 7,263,990 | B1 | 9/2007 | Lenhart |
| 7,312,424 | B2 | 12/2007 | Hannon et al. |
| 7,337,712 | B1 | 3/2008 | Wang et al. |
| 7,449,665 | B2 | 11/2008 | Fadelli et al. |
| 7,467,718 | B1 | 12/2008 | Donohue |
| 7,575,002 | B2 | 8/2009 | DeMars et al. |
| 7,681,493 | B2 | 3/2010 | Moore |
| 7,685,931 | B2 | 3/2010 | Rivera |
| 7,686,010 | B2 | 3/2010 | Gustavsen |
| D623,013 | S | 9/2010 | Alden et al. |
| D624,781 | S | 10/2010 | Allen et al. |
| 7,832,330 | B1 | 11/2010 | Thompson |
| 7,900,553 | B1 | 3/2011 | Maurin |
| 7,900,624 | B2 | 3/2011 | DeMars et al. |
| D640,896 | S | 7/2011 | Molayem |
| D642,421 | S | 8/2011 | Difante |
| 8,067,716 | B1 | 11/2011 | Lloyd |
| D653,074 | S | 1/2012 | Difante |
| D658,424 | S | 5/2012 | Difante |
| D658,425 | S | 5/2012 | Difante |
| 8,181,640 | B2 | 5/2012 | Park |
| 8,291,896 | B1 | 10/2012 | Gonnella et al. |
| 8,365,717 | B1 | 2/2013 | Perry |
| D687,257 | S | 8/2013 | DiFante |
| 8,578,927 | B2 | 11/2013 | Gustavsen |
| 8,651,018 | B1 | 2/2014 | Loud, III |
| 8,662,069 | B2 | 3/2014 | Gasparini et al. |
| 8,662,070 | B2 | 3/2014 | Johnston |
| 8,720,322 | B2 | 5/2014 | West |
| D707,075 | S | 6/2014 | Fung |
| 8,752,479 | B2 | 6/2014 | Sacherman et al. |
| 8,763,519 | B2 | 7/2014 | Ricchio et al. |
| 8,826,806 | B2 | 9/2014 | Difante |
| 9,003,962 | B2 | 4/2015 | Broerman |
| D733,483 | S | 7/2015 | Baker et al. |
| 9,182,129 | B2 | 11/2015 | Dahle et al. |
| 9,226,343 | B2 | 12/2015 | Moon et al. |
| D748,424 | S | 2/2016 | Funnell, II et al. |
| 9,504,352 | B2 | 11/2016 | Lin |
| D782,864 | S | 4/2017 | Bhogal et al. |
| D784,730 | S | 4/2017 | Kruger |
| D784,759 | S | 4/2017 | Nadal |
| D786,014 | S | 5/2017 | Knight |
| 9,635,979 | B2 | 5/2017 | Abrams et al. |
| 9,644,847 | B2 | 5/2017 | Bhogal et al. |
| 9,668,615 | B2 | 6/2017 | Contarino, Jr. |
| 9,702,563 | B2 | 7/2017 | Probst et al. |
| 9,718,220 | B1 | 8/2017 | Claridge Huggins |
| D802,996 | S | 11/2017 | Bhogal et al. |
| 9,848,731 | B2 | 12/2017 | Dahle et al. |
| 9,879,435 | B2 | 1/2018 | Kruger et al. |
| D812,973 | S | 3/2018 | Nadal |
| 9,927,129 | B2 | 3/2018 | Bhogal et al. |
| 9,970,661 | B2 | 5/2018 | Calvin |
| 10,021,889 | B2 | 7/2018 | Vinett |
| 10,024,544 | B2 | 7/2018 | Bhogal et al. |
| 10,058,172 | B2 | 8/2018 | Staib |
| D828,713 | S | 9/2018 | Correa |
| D844,961 | S | 4/2019 | Toms, Jr. et al. |
| 10,292,531 | B1 | 5/2019 | Hancock et al. |
| D861,409 | S | 10/2019 | Bhogal et al. |
| 10,523,851 | B2 | 12/2019 | Armstrong |
| 10,674,569 | B2 | 6/2020 | Luckhardt et al. |
| 10,778,876 | B2 | 9/2020 | Goettlein |
| D901,244 | S | 11/2020 | Baker et al. |
| D921,413 | S | 6/2021 | Fitzpatrick |
| 11,166,590 | B2 | 11/2021 | Zheng |
| 2002/0017290 | A1 | 2/2002 | Hines, Jr. |
| 2002/0069764 | A1 | 6/2002 | Cohen |
| 2002/0166460 | A1 | 11/2002 | O'Shea |
| 2003/0001721 | A1 | 1/2003 | Daum et al. |
| 2003/0096159 | A1 | 5/2003 | Suzuki |
| 2004/0020482 | A1 | 2/2004 | Chen |
| 2004/0025862 | A1 | 2/2004 | Lor et al. |
| 2004/0094142 | A1 | 5/2004 | Christensen et al. |
| 2004/0154611 | A1 | 8/2004 | Beech |
| 2004/0226454 | A1 | 11/2004 | Pirkle et al. |
| 2004/0255926 | A1 | 12/2004 | Waits et al. |
| 2005/0098168 | A1 | 5/2005 | Williams et al. |
| 2005/0205076 | A1 | 9/2005 | Boucher |
| 2006/0042475 | A1 | 3/2006 | Craig |
| 2006/0102167 | A1 | 5/2006 | Driscoll, Jr. |
| 2006/0124120 | A1 | 6/2006 | Gross |
| 2006/0225580 | A1 | 10/2006 | Fernandez et al. |
| 2006/0236995 | A1 | 10/2006 | Chang |
| 2006/0260603 | A1 | 11/2006 | Shah |
| 2007/0006863 | A1 | 1/2007 | Barbarich |
| 2007/0108177 | A1 | 5/2007 | Engelhardt |
| 2007/0169636 | A1 | 7/2007 | Carlson et al. |
| 2007/0221191 | A1 | 9/2007 | O'Brien et al. |
| 2007/0246453 | A1 | 10/2007 | Nam et al. |
| 2007/0277800 | A1 | 12/2007 | Chiang |
| 2008/0000467 | A1 | 1/2008 | Dudley et al. |
| 2008/0047540 | A1 | 2/2008 | Hoffman et al. |
| 2008/0085172 | A1 | 4/2008 | Harman et al. |
| 2008/0196708 | A1 | 8/2008 | Lee |
| 2008/0230043 | A1 | 9/2008 | Bruno |
| 2008/0247313 | A1 | 10/2008 | Nath et al. |
| 2009/0004348 | A1 | 1/2009 | Silva |
| 2009/0013985 | A1 | 1/2009 | Little et al. |
| 2009/0064985 | A1 | 3/2009 | Gustavsen |
| 2009/0078246 | A1 | 3/2009 | Leavens et al. |
| 2009/0165772 | A1 | 7/2009 | Hunt et al. |
| 2009/0173238 | A1 | 7/2009 | Martinez et al. |
| 2009/0229476 | A1 | 9/2009 | Bedard |
| 2009/0293860 | A1 | 12/2009 | Carlson |
| 2009/0301463 | A1 | 12/2009 | Park |
| 2010/0051600 | A1 | 3/2010 | Maier |
| 2010/0084355 | A1 | 4/2010 | Parks et al. |
| 2010/0124596 | A1 | 5/2010 | Nelson |
| 2010/0147281 | A1 | 6/2010 | Gustavsen |
| 2010/0218754 | A1 | 9/2010 | Kuntz |
| 2010/0258104 | A1 | 10/2010 | DeFoort et al. |
| 2011/0048399 | A1 | 3/2011 | Hong |
| 2011/0123689 | A1 | 5/2011 | Luckhardt et al. |
| 2011/0132347 | A1 | 6/2011 | Kim |
| 2011/0197872 | A1 | 8/2011 | Thiry |
| 2011/0214662 | A1 | 9/2011 | Contarino, Jr. |
| 2011/0219957 | A1 | 9/2011 | Fogolin |
| 2011/0219958 | A1 | 9/2011 | Noble |
| 2011/0265663 | A1 | 11/2011 | Li |
| 2012/0017884 | A1 | 1/2012 | Van Den Hoff et al. |
| 2012/0060819 | A1 | 3/2012 | Hunt et al. |
| 2012/0076351 | A1 | 3/2012 | Yoon et al. |
| 2012/0107476 | A1 | 5/2012 | McLemore et al. |
| 2012/0174798 | A1 | 7/2012 | Kulikowski |
| 2012/0225178 | A1 | 9/2012 | Degnan |

(56) References Cited

U.S. PATENT DOCUMENTS

| | | |
|---|---|---|
| 2012/0240790 A1 | 9/2012 | Difante |
| 2012/0258229 A1 | 10/2012 | Mindrup |
| 2012/0260903 A1 | 10/2012 | Buerkle |
| 2012/0269028 A1 | 10/2012 | Gordon |
| 2013/0074702 A1 | 3/2013 | Difante |
| 2013/0081609 A1 | 4/2013 | Dhuper et al. |
| 2013/0112186 A1 | 5/2013 | Crichlow |
| 2013/0125765 A1 | 5/2013 | Difante |
| 2013/0276643 A1 | 10/2013 | Krolick et al. |
| 2013/0319258 A1 | 12/2013 | Cleveland et al. |
| 2014/0026762 A1 | 1/2014 | Riefenstein |
| 2014/0026881 A1 | 1/2014 | Abrams et al. |
| 2014/0048055 A1 | 2/2014 | Ruther |
| 2014/0130788 A1 | 5/2014 | Contarino, Jr. |
| 2014/0144333 A1 | 5/2014 | Ahmed |
| 2014/0165851 A1 | 6/2014 | Shingler |
| 2014/0196609 A1 | 7/2014 | Snyman |
| 2014/0251160 A1 | 9/2014 | Contarino, Jr. |
| 2014/0287119 A1 | 9/2014 | Dahle et al. |
| 2014/0299005 A1 | 10/2014 | Vinett |
| 2015/0027432 A1 | 1/2015 | Contarino, Jr. |
| 2015/0034065 A1 | 2/2015 | McQuillan |
| 2015/0068512 A1 | 3/2015 | Mehler et al. |
| 2015/0079250 A1 | 3/2015 | Ahmed |
| 2015/0114238 A1 | 4/2015 | Palermo |
| 2015/0124849 A1 | 5/2015 | Parthasarathy |
| 2015/0164278 A1 | 6/2015 | Kohler et al. |
| 2015/0201805 A1 | 7/2015 | Cedar et al. |
| 2015/0208669 A1 | 7/2015 | Klock et al. |
| 2015/0233585 A1 | 8/2015 | Creel |
| 2015/0253364 A1 | 9/2015 | Hieda et al. |
| 2015/0285512 A1 | 10/2015 | Matarazzi et al. |
| 2015/0285513 A1 | 10/2015 | Matarazzi et al. |
| 2015/0289719 A1 | 10/2015 | Contarino, Jr. |
| 2015/0297029 A1 | 10/2015 | Smith et al. |
| 2015/0305560 A1 | 10/2015 | Hamlin |
| 2015/0320259 A1 | 11/2015 | Tucker |
| 2015/0338104 A1 | 11/2015 | Lipinski |
| 2015/0371513 A1 | 12/2015 | Stokes |
| 2016/0102868 A1 | 4/2016 | Johnson et al. |
| 2016/0102869 A1 | 4/2016 | Johnson et al. |
| 2016/0174766 A1 | 6/2016 | Schlosser et al. |
| 2016/0183723 A1 | 6/2016 | Nadal |
| 2016/0183724 A1 | 6/2016 | Nadal |
| 2016/0227965 A1 | 8/2016 | Johnston et al. |
| 2016/0302606 A1 | 10/2016 | Kallos |
| 2016/0334112 A1 | 11/2016 | Wiseman et al. |
| 2016/0366314 A1 | 12/2016 | Pfaffinger, Jr. et al. |
| 2017/0020148 A1 | 1/2017 | Dixon et al. |
| 2017/0020337 A1 | 1/2017 | Borovicka et al. |
| 2017/0055535 A1 | 3/2017 | Froelicher et al. |
| 2017/0065124 A1 | 3/2017 | Colston |
| 2017/0074522 A1 | 3/2017 | Cheng |
| 2017/0102149 A1 | 4/2017 | Nadal |
| 2017/0115008 A1 | 4/2017 | Erbe et al. |
| 2017/0195542 A1 | 7/2017 | Thomas et al. |
| 2017/0257226 A1 | 9/2017 | Bi |
| 2017/0261213 A1 | 9/2017 | Park et al. |
| 2017/0303348 A1 | 10/2017 | Kondo et al. |
| 2017/0332841 A1 | 11/2017 | Reischmann |
| 2018/0058702 A1 | 3/2018 | Jang et al. |
| 2018/0157232 A1 | 6/2018 | Chen |
| 2018/0187898 A1 | 7/2018 | Matarazzi et al. |
| 2018/0296031 A1* | 10/2018 | Terrell, Jr. .......... A47J 37/0704 |
| 2018/0324908 A1 | 11/2018 | Denker et al. |
| 2018/0325314 A1 | 11/2018 | Walters |
| 2018/0347821 A1 | 12/2018 | Wild |
| 2018/0368618 A1 | 12/2018 | Measom et al. |
| 2018/0372326 A1 | 12/2018 | Park et al. |
| 2019/0132396 A1 | 5/2019 | Finnegan et al. |
| 2019/0134580 A1 | 5/2019 | Ghazarian |
| 2019/0274476 A1 | 9/2019 | Dahle et al. |
| 2019/0277509 A1 | 9/2019 | Hildner et al. |
| 2019/0285283 A1 | 9/2019 | Ebrom et al. |
| 2019/0298107 A1 | 10/2019 | Baker et al. |
| 2020/0041134 A1 | 2/2020 | Luckhardt et al. |
| 2020/0069111 A1 | 3/2020 | Eiter et al. |
| 2020/0154943 A1 | 5/2020 | Baker |
| 2020/0154944 A1 | 5/2020 | Baker |
| 2020/0214503 A1 | 7/2020 | Altenritter |
| 2020/0236743 A1 | 7/2020 | Yang et al. |
| 2020/0281402 A1 | 9/2020 | Witzel et al. |
| 2021/0052107 A1 | 2/2021 | Pruitt et al. |
| 2021/0071871 A1 | 3/2021 | Stork-Wersborg |
| 2021/0113016 A1 | 4/2021 | Dean |
| 2021/0152578 A1 | 5/2021 | Alanazi |
| 2021/0222887 A1 | 7/2021 | Moore et al. |
| 2021/0356130 A1 | 11/2021 | Li |
| 2021/0401223 A1 | 12/2021 | Han et al. |
| 2022/0170638 A1 | 6/2022 | Baker et al. |
| 2022/0373173 A1 | 11/2022 | Chlebovec |
| 2023/0083403 A1 | 3/2023 | Jun et al. |

FOREIGN PATENT DOCUMENTS

| | | |
|---|---|---|
| CN | 102300492 | 12/2011 |
| CN | 206669789 U | 11/2017 |
| CN | 107616719 | 1/2018 |
| CN | 107697574 A * | 2/2018 |
| CN | 207804089 U | 9/2018 |
| CN | 208967878 U | 6/2019 |
| CN | 211657980 U | 10/2020 |
| CN | 112263156 | 1/2021 |
| CN | 112716318 | 4/2021 |
| CN | 213189188 U | 5/2021 |
| CN | 113558489 | 10/2021 |
| CN | 114089639 | 2/2022 |
| DE | 102008042804 | 4/2009 |
| DE | 202013000669 U1 | 6/2013 |
| FR | 2597319 | 10/1987 |
| JP | 2008286466 | 11/2008 |
| JP | 2014-192083 | 10/2014 |
| KR | 20160006359 | 6/2016 |
| WO | 01/23808 | 4/2001 |
| WO | 2022/204182 | 9/2022 |

OTHER PUBLICATIONS

International Search Report and Written Opinion of the International Searching Authority completed Jan. 22, 2021, in International Patent Application No. PCT/US2020/062211, 10 pages.

International Search Report and Written Opinion of the International Searching Authority completed Feb. 15, 2024, in International Patent Application No. PCT/US2023/080610, 19 pages.

International Search Report and Written Opinion of the International Searching Authority completed Oct. 20, 2022 (+ English translation), in International Patent Application No. PCT/CN2022/078958, 15 pages.

Casement Window: Site Visited Oct. 30, 2024, available from URL: https://www.archiexpo.com/prod/andersen/product-8990-1349389.html, 3 pages.

Drip EZ Pellet Grip Hopper Shelf, announced online Jun. 23, 2023, site visited Oct. 30, 2024, at https://www.bbqguys.com/drip-ez/pellet-grill-hopper-shelf-hs-1, 7 pages.

GMG Hopper Assembly for Ledge, site visited Oct. 30, 2024, available from URL: https://grillcollection.com/products/gmg-hopper-assembly-for-ledge-daniel -boone-and-peak-jim-bowie-12v-only-stainless-steel-lid-with-window, 6 pages.

Partial Supplementary European Search Report dated Nov. 10, 2025, in European (EP) Patent Application No. 22929310.5, 14 pages.

International Search Report and Written Opinion of the International Searching Authority mailed Nov. 27, 2024, in International Patent Application No. PCT/US2024/044927, 13 pages.

* cited by examiner

JAMMING RESISTANT AUGER FOR COOKER

RELATED APPLICATION

This application claims the benefit of priority from U.S. Provisional Patent Application Nos. 63/640,706 filed Apr. 30, 2024, and 63/535,840 filed Aug. 31, 2023, the contents of which are incorporated herein by reference.

FIELD OF THE INVENTION

The present invention relates to systems and devices for delivering combustible material to a burn box for use in cooking appliances, such as grills, smokers, or other types of cookers. More specifically, it pertains to an auger-based material transport system designed to prevent jamming, ensure consistent material flow, and reduce backflow of combustion gases, while enabling the use of irregularly shaped and sized combustible materials. The invention also addresses mechanisms for controlling the flow of combustible material, reducing the risk of bridging, and enhancing overall system reliability and efficiency.

BACKGROUND OF THE INVENTION

Grills and smokers have long been popular tools for outdoor cooking, with wood pellets often used as fuel due to their ability to provide consistent heat and flavor. However, wood pellets are expensive to produce, requiring a significant amount of energy. The process involves grinding wood into fine sawdust, pushing it through a die under high temperature and pressure to melt the lignin, and then rapidly cooling the material to form pellets. This energy-intensive process may reduce the wood's natural flavor imparted by guaiacol-a key molecule responsible for the distinct taste of smoked foods.

Wood chips, by contrast, require only minimal processing—typically just one or two passes through a chipper—without the need for high energy consumption or complex machinery. As a result, wood chips offer a good alternative to pellets. Furthermore, it is believed that wood chips, due to the preservation of guaiacol during the chipping process, may impart a richer, more authentic wood smoke flavor to food compared to pellets.

Despite the advantages of wood chips, their use in grills and smokers has been limited due to challenges in reliably delivering them to the firebox. Wood chips, being irregular in shape and size, are prone to jamming, which can interrupt the flow of fuel and cause inconsistent cooking temperatures. The present invention addresses these issues by providing a reliable system for delivering wood chips or other irregular combustible material to a firebox, particularly in a barbecue grill setting, as well as to reduce backflow of combustion gases.

SUMMARY OF THE INVENTION

The invention features an auger tube larger in diameter than the auger itself, allowing the auger to pivot when it encounters larger chips, thus preventing jams. This design has proven effective in maintaining a consistent flow of wood chips, something that was not possible with previous designs that used fixed-position augers. Additionally, the inclusion of a rotating clearing mechanism ensures that the wood chips do not bridge or clump together, further improving the reliability of the fuel delivery system. In addition, the inclusion of an optional auger cover flap reduces backflow of combustion gases. This innovation makes the use of wood chips in grills and smokers more practical and safer, and that represents a significant advancement in barbecue technology.

In some embodiments, a device for delivering and burning combustible material includes a hopper, a burn box to receive and burn the combustible material, an auger tube through which the combustible material is moved from the hopper to the burn box, a motor, and an auger pivotably connected within the auger tube to facilitate adjustment of the auger's orientation within the auger tube in response to irregularly sized or shaped combustible material. In alternative embodiments, the motor includes a drive shaft having an axis of rotation and the auger is pivotably connected to the drive shaft to allow the auger to pivot relative to the drive shaft about an axis substantially perpendicular to the axis of rotation of the drive shaft.

In some embodiments, an apparatus for delivering and burning combustible material includes a hopper to store combustible material, a burn box having an inner volume defined by a sidewall and a bottom wall capable of burning combustible material, an auger tube having an inlet end in communication with the hopper and an outlet end in communication with the burn box, the auger tube suitable for transporting combustible material from the hopper to the burn box, a motor configured to drive the auger, the motor having a drive shaft with an axis of rotation, and an auger positioned within the auger tube, the auger being rotatable about a longitudinal axis to facilitate movement of the combustible material through the auger tube, wherein the auger is pivotably connected within the auger tube to facilitate adjustment of the auger's orientation within the auger tube in response to irregularly sized or shaped combustible material. In alternative embodiments, the auger pivots relative to the drive shaft about an axis that is substantially perpendicular to the axis of rotation of the drive shaft.

In some embodiments, a system for delivering and burning combustible material in a cooking appliance including a hopper to store combustible material, an auger tube having an inlet end in communication with the hopper and an outlet end, the auger tube facilitating transport of combustible material from the hopper to the outlet end, an auger positioned within the auger tube, the auger being rotatable about a longitudinal axis to move the combustible material through the auger tube, a burn box having an inner volume defined by a sidewall and a bottom wall, the burn box receives and burns combustible material delivered from the auger tube, a motor with a drive shaft having an axis of rotation, and a pivotable coupling connecting the auger to the drive shaft of the motor, the pivotable coupling enabling the auger to pivot relative to the drive shaft about an axis that is substantially perpendicular to the axis of rotation of the drive shaft, wherein the auger can pivot within the auger tube in response to irregularly sized or shaped combustible material.

In alternative embodiments, the invention includes a cover flap pivotally mounted at an outlet end of the auger tube to cover the outlet end to allow combustible material to exit the outlet end when the auger is rotating with combustible material in the auger tube. In certain embodiments, the invention includes a loop extending through at least two openings in the cover flap, the loop being attached to the auger tube or the burn box, wherein the cover flap is constrained to pivot around the loop in a path that is substantially parallel to the longitudinal direction of the auger tube. In other embodiments, the cover flap lays flat against the outlet end under the force of gravity when the auger is not rotating, thereby preventing combustion gases from escaping into the auger tube, and pivots open when the combustible material is forced through the auger tube by the rotating auger.

In alternative embodiments, the diameter of the auger tube is substantially larger than the diameter of the auger.

In alternative embodiments, at least one pin is rotatably mounted over an opening through which combustible material engages the auger and is oriented substantially perpendicular to the axis of rotation of the auger.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
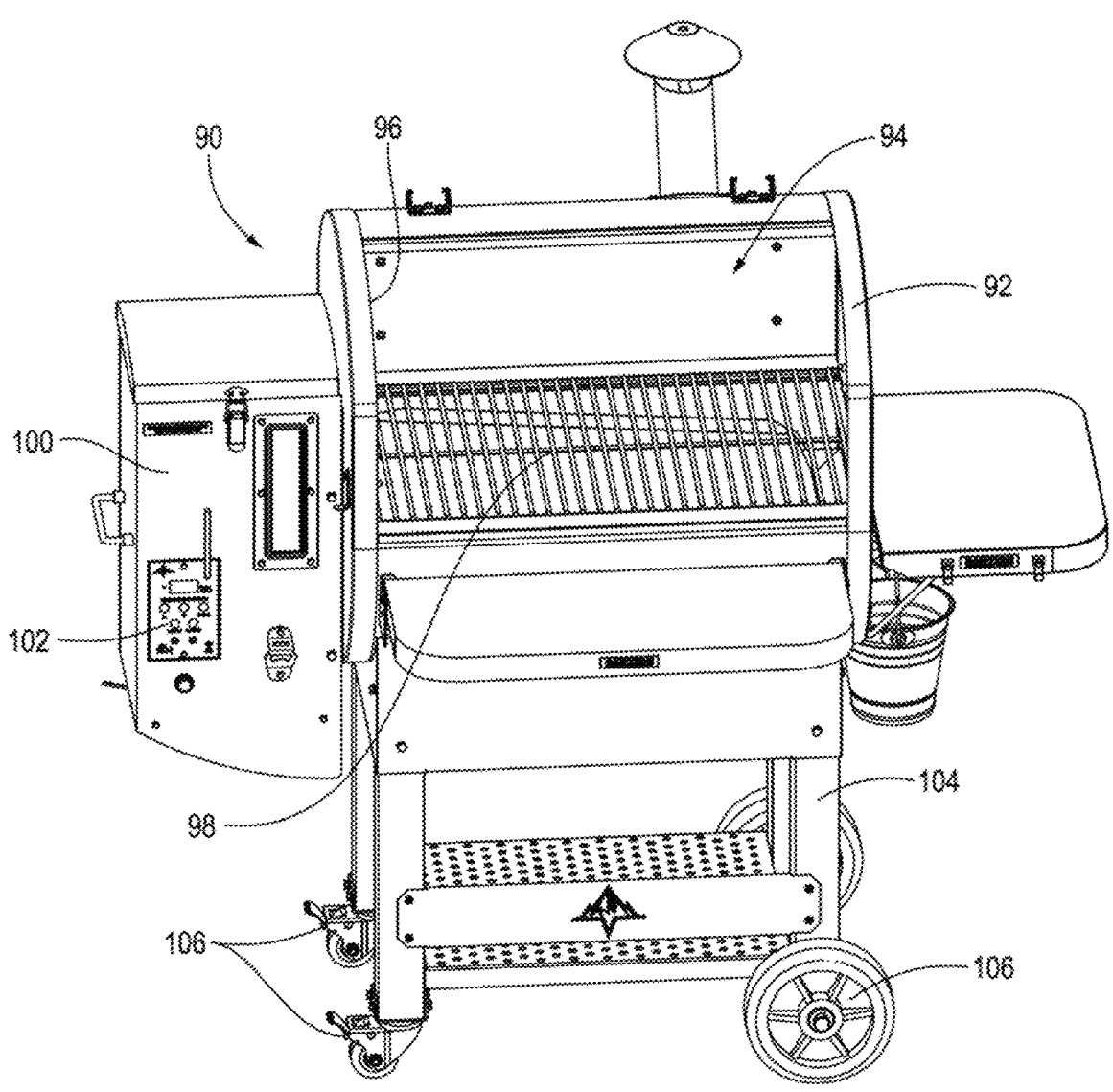
FIG. 1 is an external view of a cooker, such as a grill or smoker, incorporating the auger cover flap system, illustrating the placement of the burn box and auger system within the cooker housing.

Referring to FIGS. 1 through 4, a cooker 90, such as a smoker, outdoor grill, or other type of cooker includes a housing 92 defining a cooking chamber 94. The cooking chamber 94 may be accessible through an opening 96 that is selectively covered by a lid (not shown). A grill 98 or other support surface may be positioned within the cooking chamber 94 for supporting an item cooked within the cooking chamber 94. A control housing 100 mounted to or near the housing 92 may contain a hopper 78, fan 70, motor 72, an air chamber 74, an auger tube 14, an auger 16, and a motor 80 for driving the auger 16. The control housing 100 may further house a controller 102 coupled to the motors 72, 80 and configured to control the motors 72, 80, such as in response to the output of a sensor configured to sense the temperature within the cooking chamber 94 and coupled to the controller 102. The housing 92 and/or control housing 100 may be mounted to a frame 104 that itself is mounted on wheels 106 for relocating the cooker 90. The auger tube 14 and auger 16 extend into the cooking chamber 94 with a burn box 24 (see FIG. 6) located in and/or under the cooking chamber 94.

The illustrated cooker 90 is exemplary only. Any cooker or heating device using an auger to supply combustible material to be burned may benefit from the invention features described herein.

Figure 2:
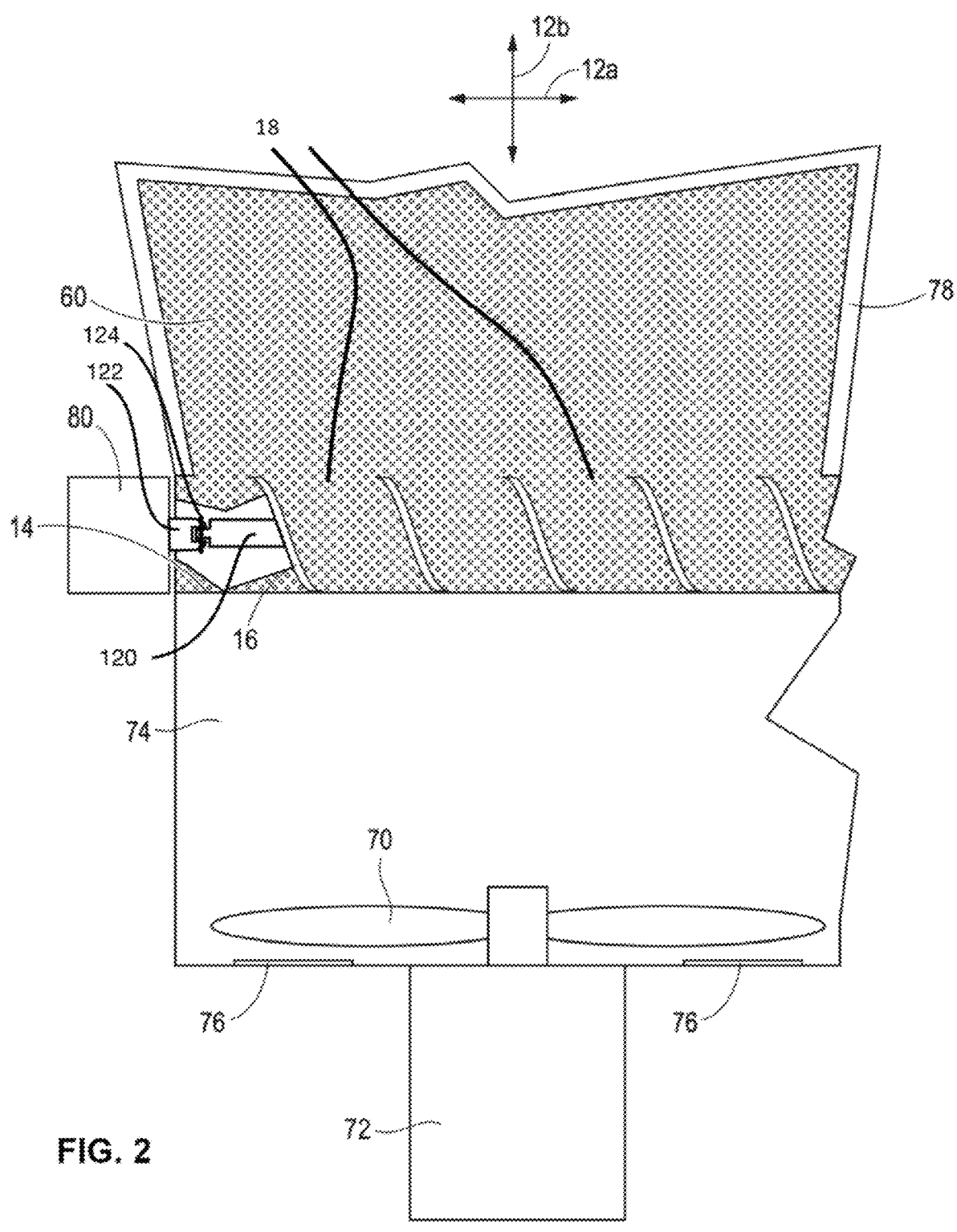
FIG. 2 is a cross-sectional view of a part of the cooker housing, including the hopper, auger tube, burn box, fan, and motor assembly showing the overall arrangement of components, and further showing an embodiment including a pivotable coupling between the auger shaft and the drive motor that allows the auger to pivot within the auger tube to accommodate irregularly shaped combustible materials.
Figure 2A:
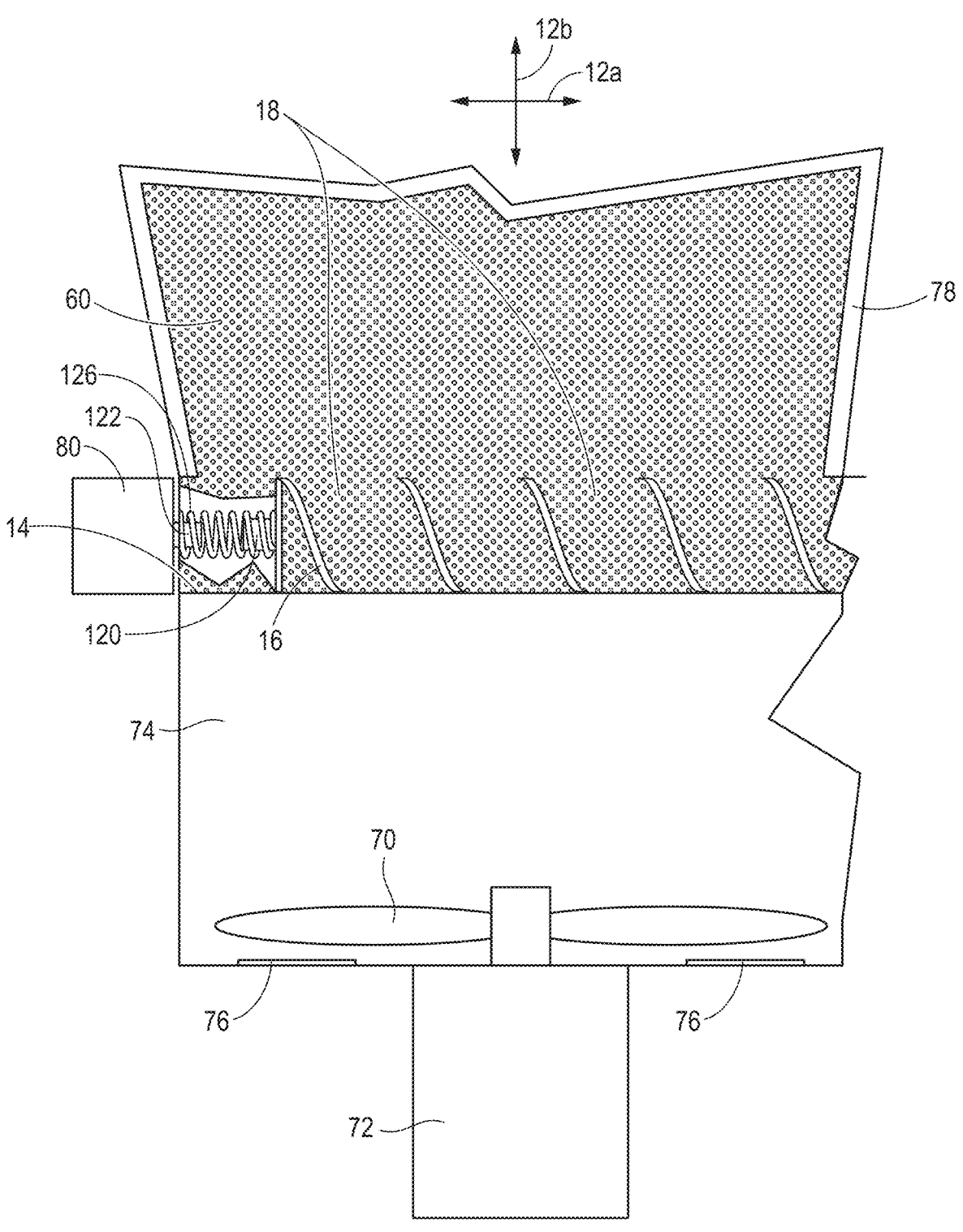
FIG. 2A is a cross-sectional view of a part of the cooker housing, including the hopper, auger tube, burn box, fan, and motor assembly showing the overall arrangement of components, and further showing a spring concentrically connected between the auger shaft and the drive motor that allows the auger to pivot axially within the auger tube to accommodate irregularly shaped combustible materials.
Figure 3:
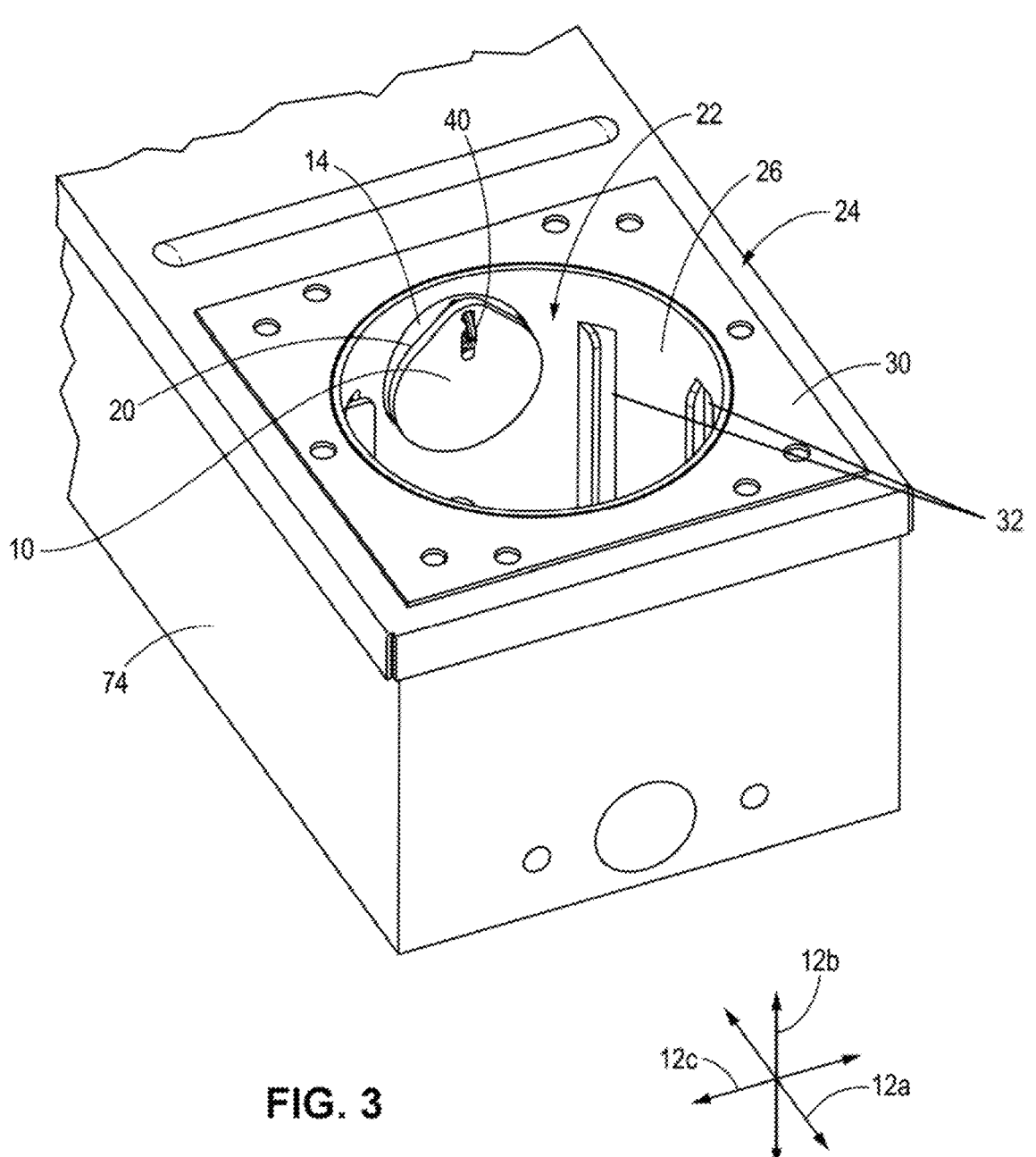
FIG. 3 is a perspective view of the burn box showing the overall arrangement of components around the auger cover flap.

Referring to FIGS. 2, 2A and 3, the auger 16 may be formed in a spiral shape around an auger shaft 120, such as shaft made of steel, aluminum, or other material. The auger shaft 120 is coupled to the motor 80 such that the auger shaft 120 can pivot relative to the motor 80 about an axis that is substantially (e.g., within 10, 5, or 2 degrees of) perpendicular to the axis of rotation of a motor shaft 122 from the motor 80. For example, the auger shaft 120 may be coupled to the motor shaft 122 by a pin 124. Alternatively, the joint between the auger shaft 120 and the motor shaft 122 may be embodied as a clevis pin link, universal joint, or other type of joint permitting rotation about a first axis while enabling torque transmission about a second axis that is substantially perpendicular to the first axis. In yet another alternative embodiment, a spring 126 wound in the same direction as the rotation of the auger, concentrically connected between the auger and the motor, allows the auger to "float" within the confines of the auger tube in any points in the plane defined by a cross-section of the auger tube.

The hopper 78 containing the combustible material 60 that may be positioned above the auger 16 and auger tube 14. The auger 16 is rotated by the motor 80, causing the combustible material 60 to be conducted along the auger tube 14 to the inner volume 22 of the burn box 24. The auger 16 is rotated by a motor or manually to drive combustible material from an opening 18 positioned under the hopper 78 or other source of the combustible material to an outlet end 20. As is apparent, the outlet end 20 may be substantially (e.g., within 5 degrees of) perpendicular to the axis of symmetry of the cylindrical auger tube 14. The axis of symmetry of the cylindrical auger tube 14 may be substantially (e.g., within 5 degrees of) parallel to the longitudinal direction 12a such that the outlet end 20 is substantially parallel to the vertical direction 12b and horizontal direction 12c. Likewise, the axis of rotation of the auger 16 may be substantially parallel to the longitudinal direction 12a.

The outlet end 20 is positioned within, or is otherwise in fluid communication with an inner volume 22 of the burn box 24 in which combustible material is burned to heat a cooking chamber, grill, or other structure. In the illustrated embodiment, the inner volume of the burn box 24 is defined by a sidewall 26 having and a bottom wall 28 extending across the bottom of the sidewall 26. The upper end of the sidewall 26 may be open and may have a mounting plate 30 mounted thereto for mounting the burn box 24 to cooking chamber, housing for a grill, or other structure. In the illustrated embodiment, the sidewall 26 is generally cylindrical with various openings formed therein, with the axis of the cylinder being substantially parallel to the vertical direction 12b. The sidewall 26 may have one or more vent openings 32 formed therein. In the illustrated embodiment, louvers 34 positioned adjacent each opening 32 direct air passing through the openings 32 into the inner volume 22 to spin, thereby cooling the sidewall 26. The louvers 34 may be formed by bending portions of the sidewall 26 inward. The outlet end 20 may be positioned closer to the top of the sidewall 26 than to the bottom wall 28 such that combustible material forced out of the outlet end 20 by the auger 16 will fall onto the bottom wall 28 and be burned. The burn box 24 may be configured according to any approach for implementing a burn box known in the art. The burn box 24 may include an igniter, temperature sensor, or any other component known to be used with a burn box 24.

Figure 4:
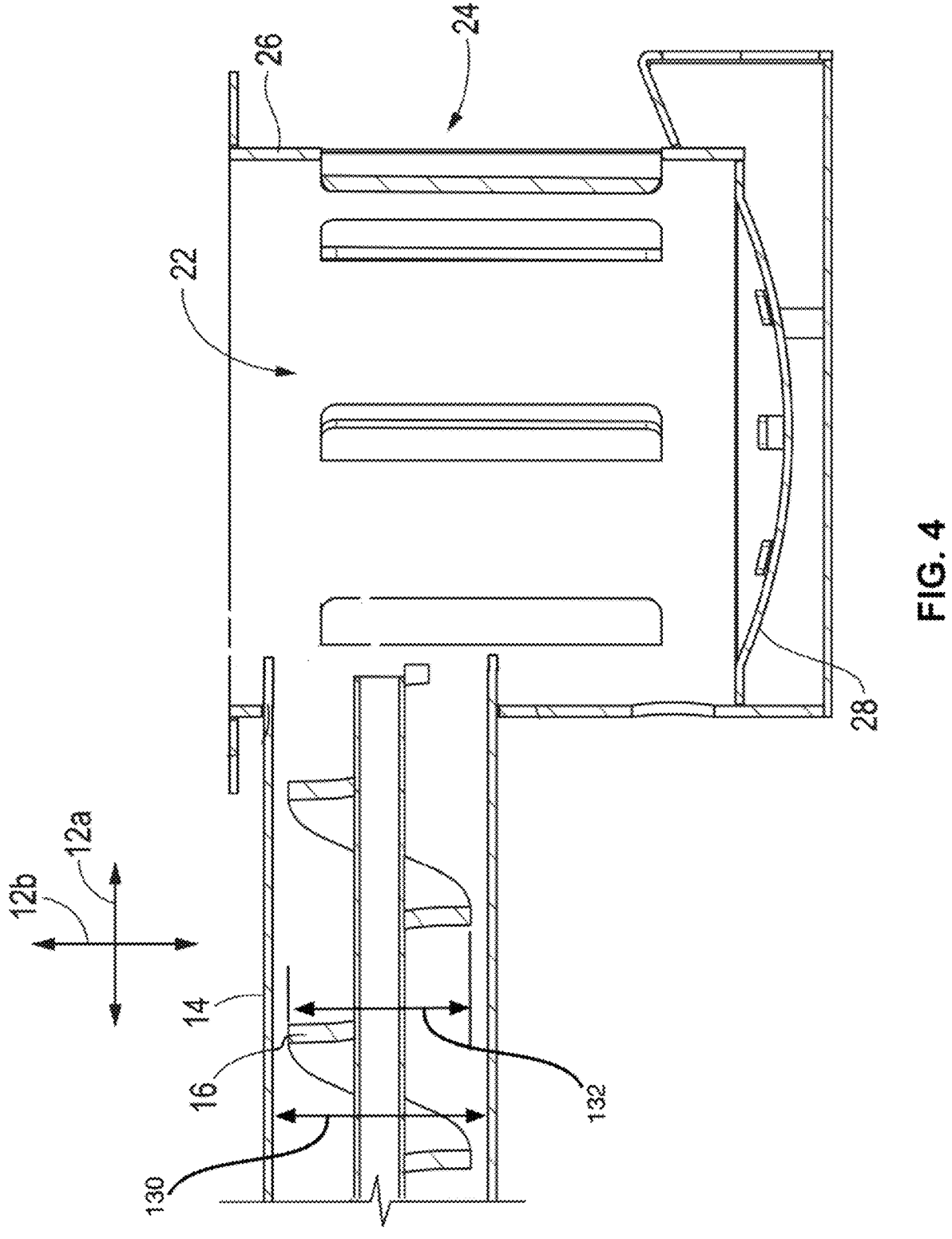
FIG. 4 is a cross-sectional view of the oversized auger tube relative to the auger, highlighting the space that allows the auger to "float" and prevent jamming when larger chunks of combustible material are used.
Figure 5:
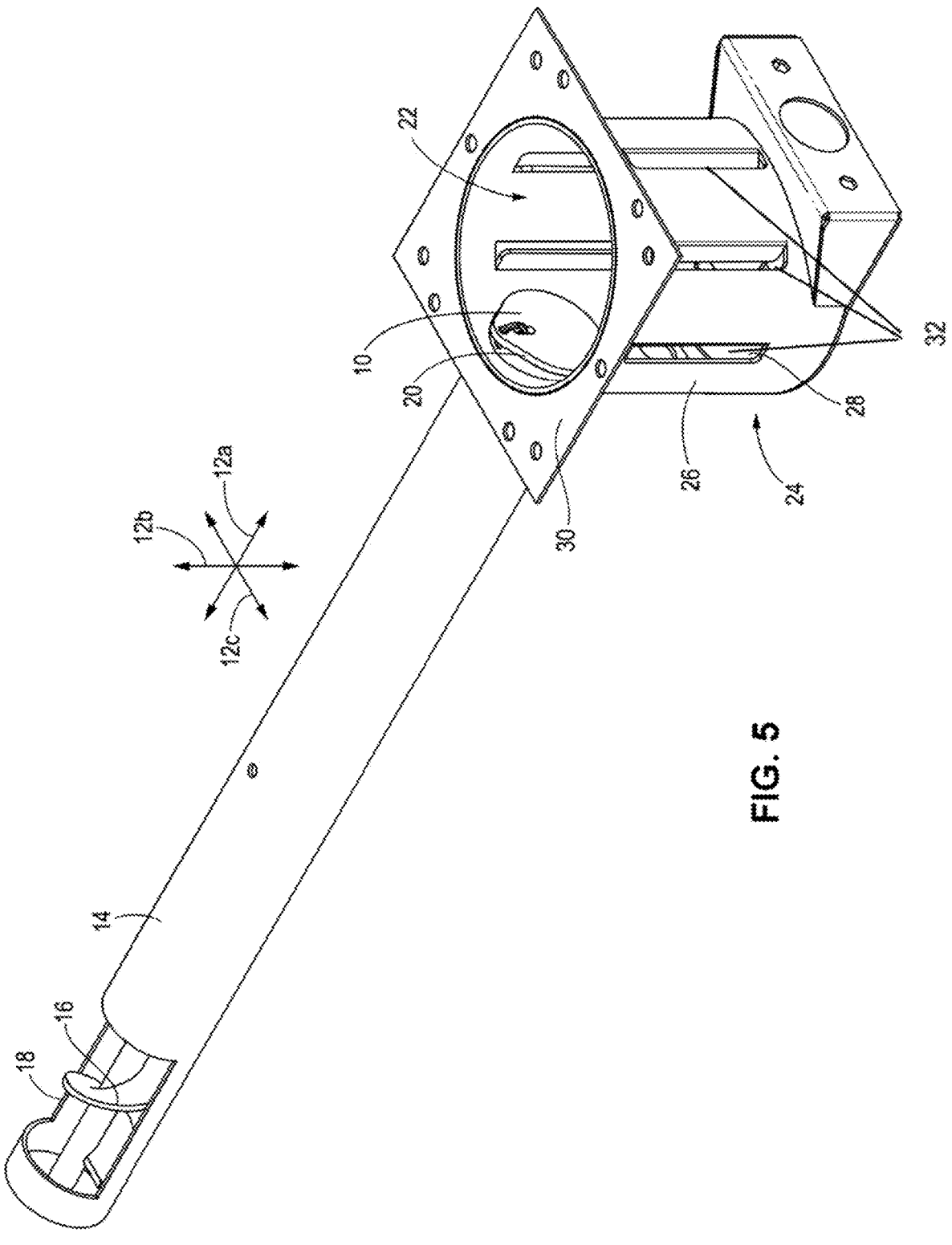
FIG. 5 is a perspective view of an auger cover flap and associated components within an auger tube and burn box assembly, illustrating the orientation of the flap with respect to the longitudinal, vertical, and horizontal directions.

Referring to FIG. 4, in some embodiments, a diameter 130 of the auger tube 14 may be substantially larger than a diameter 132 of the auger 16, such as between 5 and 25 percent larger, or between 10 and 15 percent larger. In some embodiments, diameter 130 is at least 0.375 inches larger than the diameter 132. The difference in diameters 130, 132 in combination with the joint between the motor and auger shafts 120, 122 enables the auger 16 to "float." When using irregularly sized and shaped combustible material 60 (shown with reference to FIG. 9), there may be chunks or clumps of combustible material 60 that would tend to jam the auger 14. Enabling the auger 16 to pivot within an oversized tube 14 reduces the probability of this occurring. Enabling the auger 16 to pivot further enables the combustible material 60 to include larger chunks, which are cheaper to make. Enabling the auger 16 to pivot further reduces the amount of power required from the motor 80 in order to achieve consistent operation.

In some embodiments, a wood conditioner is positioned between the hopper 78 and the auger tube 14 for grinding wood chips into smaller wood chips, as described in U.S. application Ser. No. 17/167,804, filed Feb. 4, 2021 and entitled FUEL CONDITIONER FOR GRILL, which is hereby incorporated herein by reference in its entirety.

In some embodiments, described with reference to FIGS. 3 and 5 through 8, an auger cover flap 10 may be used to reduce combustion of pellets, wood chips, or other combustible material within the auger tube 14 having the auger 16 positioned therein. The auger flap 10 may be understood with respect to a longitudinal direction 12a, vertical direction 12b, and horizontal direction 12c that are all mutually perpendicular. The vertical direction 12b may correspond to the direction of gravity during use.

The auger flap 10 may be mounted to the auger tube 14, or to the sidewall 26 by a loop 40. The loop 40 may pass through an upper opening 42 defined by the auger flap 10 and a lower opening 44 defined by the auger flap 10. The openings 42, 44 may be offset from one another along the vertical direction 12b. The lower opening 44 may be oblong with the long dimension thereof oriented substantially (e.g., within 5 degrees of) parallel to the vertical direction 12b. For example, the long dimension of the lower opening 44 may be between 1.5 and 4 times the diameter of the upper opening 42, which may be substantially the same, e.g., within 5% of, the width of the lower opening 44 in the horizontal direction 12c. The diameter of the upper opening 42 and width of the lower opening 44 may be slightly, e.g., between 1 and 5 percent greater than the width of the loop 40 such that the openings 44 are able to freely slide along the loop 40.

In the illustrated embodiment, the auger flap 10 includes a circular portion 48. The circular portion 48 may be substantially, e.g., preferably within 3 percent of, equal to the outer diameter of the auger tube 14 and at least larger than the inner diameter of the auger tube 14 such that the auger flap 10 will not be inducted into the auger tube 14 during use. The auger flap 10 may include a non-circular portion 50, e.g., a protrusion from the circular portion 48. The upper opening 42 may be partially or completely positioned within the non-circular portion 50. In particular, the size of the loop 40 and position of the upper opening 42 may be such that at rest and under the action of gravity, the auger flap 10 will rest flat against the outlet end 20 with the perimeter of the circular portion 48 substantially aligned with the perimeter of the auger tube 14, e.g., within x*D of aligned along the vertical and horizontal directions 12b, 12c, where D is the diameter of the auger tube 14 and x is a value less than 0.1, 0.05, or 0.01. The auger flap 10 itself may be formed of a flat plate or other shape such that a surface of the auger flap 10 in contact with the outlet end 20 will conform to the outlet end 20. The auger flap 10 may be made of aluminum, stainless steel, or other type of steel or other metal.

The engagement of the openings 42, 44 with the loop 40 constrains the auger flap 10 to pivot around the loop 40, or cause the loop 40 to pivot within opening 46, in a rotational path 52 that is substantially, e.g., within 5 degrees of, parallel to the longitudinal direction 12a and the vertical direction 12b. The use of two openings 42, 44 rather than a single opening helps avoid movement of the auger flap away from the path 52 and becoming stuck in an open position.

The auger tube 14 may itself define an opening 46 with the loop 40 passing through the opening 46. The portion of the auger tube 14 defining the opening 46 may be positioned within the inner volume 22 of the burn box 24. The loop 40 may be implemented as a piece of metal formed into a ring. The loop 40 may for example be implemented as a curved or straight material bent into a ring shape passing through the openings 42, 44, 46. The loop 40 may be free to move within the opening 46 or may be welded or otherwise secured in place relative to the auger tube 14. The diameter of opening 46 may be slightly, e.g., between 1 and 5 percent greater than the width of the loop 40 such that the ring 40 is able to freely move through the opening 46.

Figure 6:
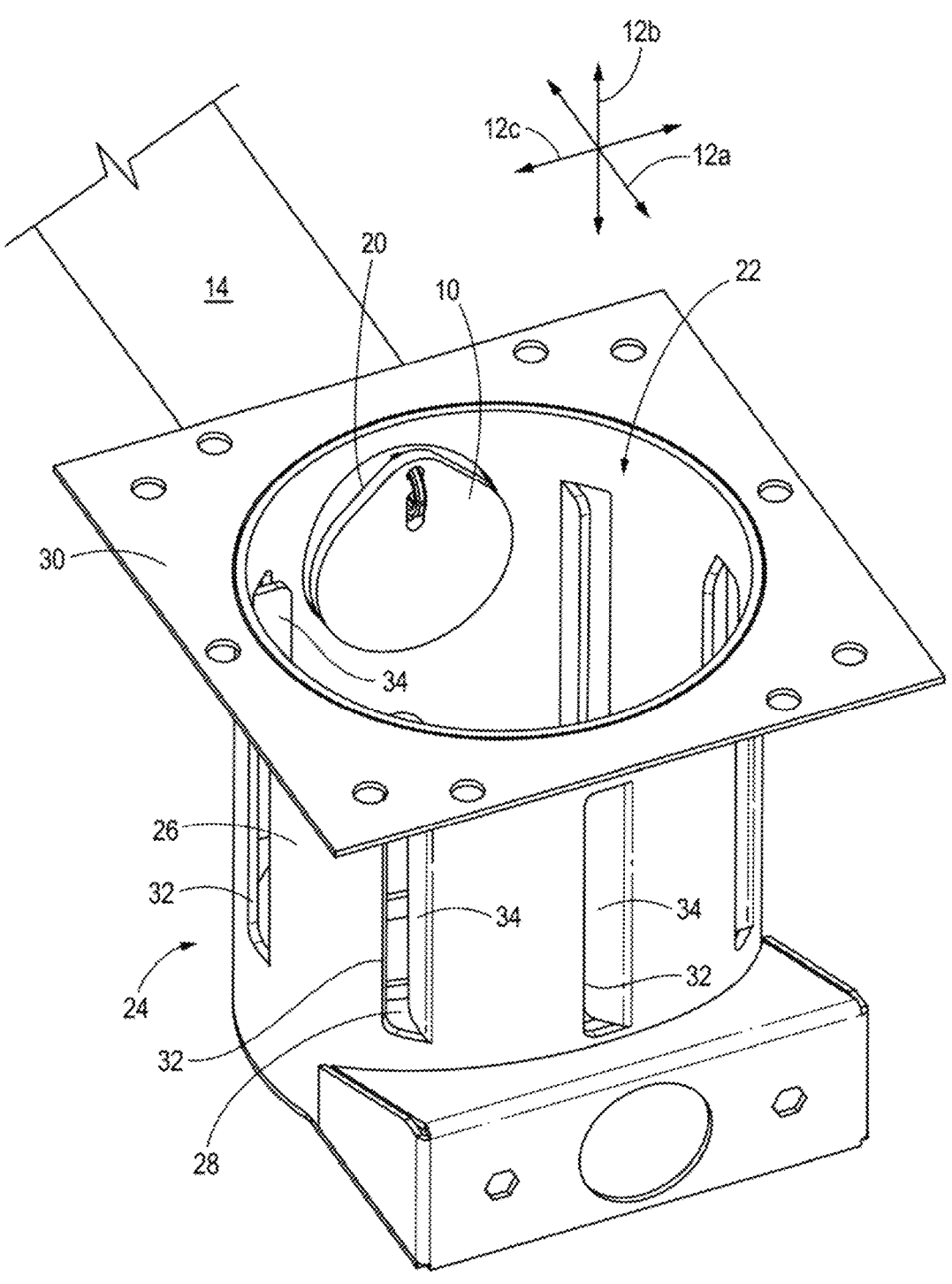
FIG. 6 is a side cross-sectional view of the auger tube, burn box, and auger cover flap assembly, showing the internal components, including the positioning of the auger, burn box, and the relationship between the auger tube and the cover flap.
Figure 7:
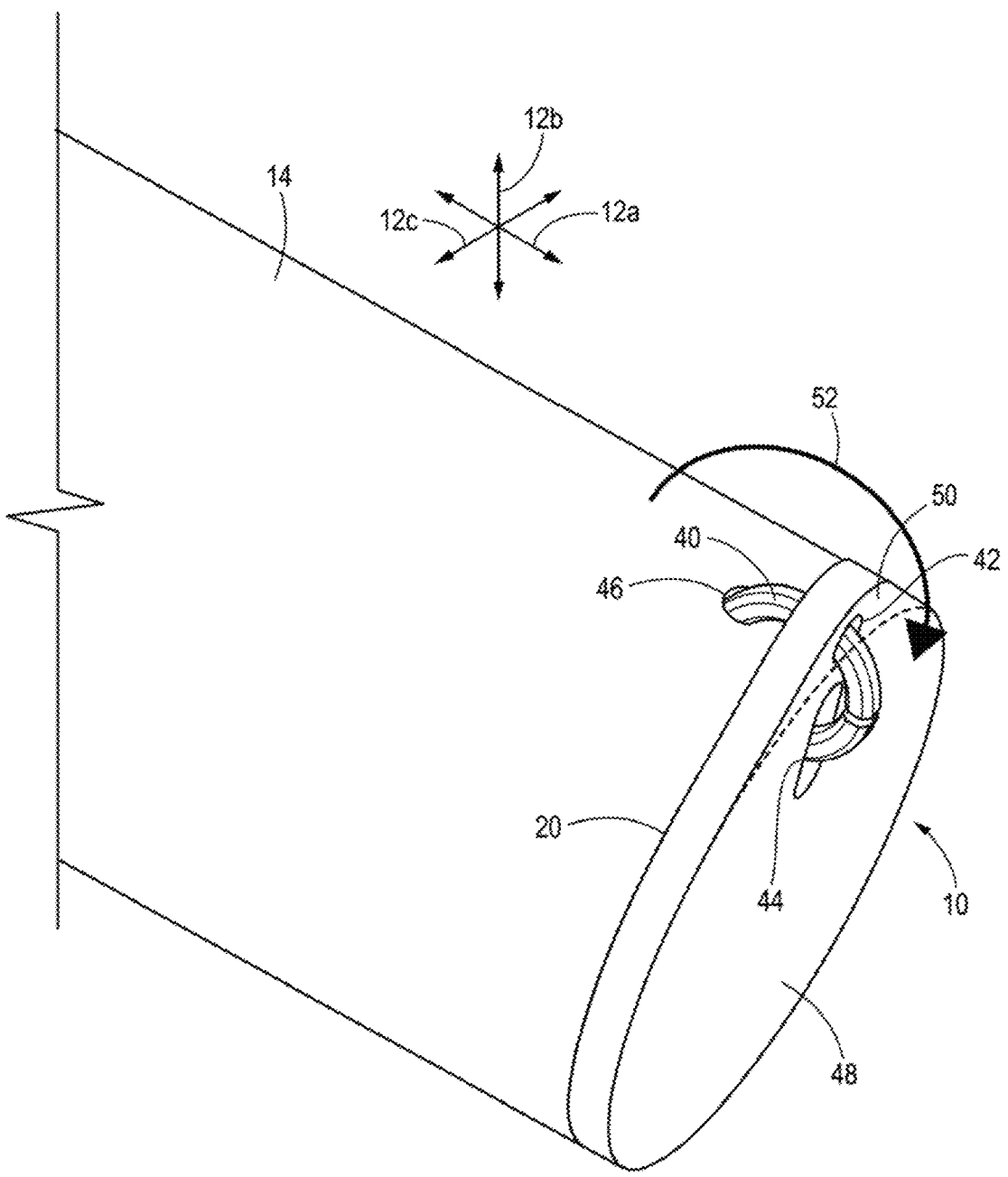
FIG. 7 is an exploded view of the auger flap, auger tube, and loop assembly, depicting the attachment of the auger flap to the auger tube and the sidewall of the burn box via the loop, as well as the sliding mechanism of the flap along the loop.

Referring back to FIGS. 2 and 3 and further with reference to FIG. 6, in some applications, air will be forced into the burn box 24 through openings 32. In such applications, the air pressure within the burn box 24 may urge the auger flap 10 against the outlet end 20 of the auger tube 14. For example, a fan 70 driven by a motor 72 may force air into an air chamber 74 through openings 76 for receiving ambient air. The air chamber 74 may be extended around the burn box 24 such that air forced into the air chamber 74 will be forced through the openings 32 into the inner volume 22, urging the openings 32 to spin via the louvres 34.

Figure 8A:
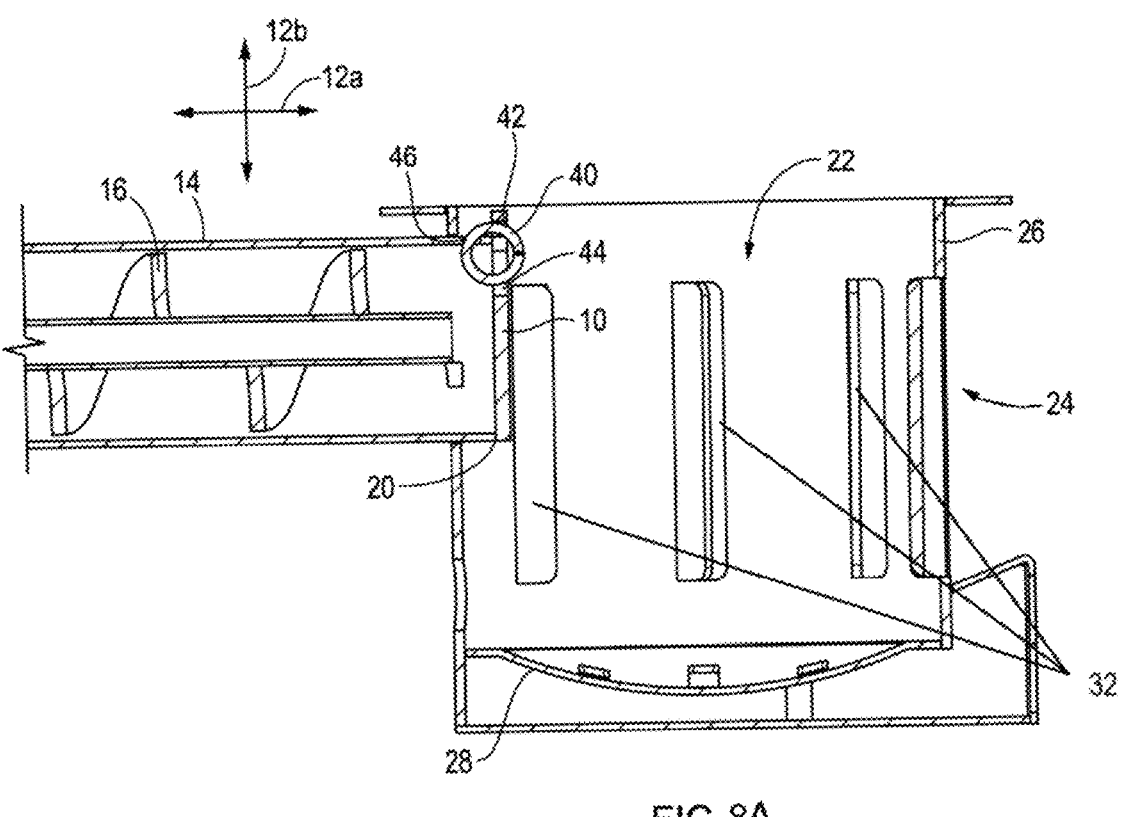
FIG. 8A is a cross-sectional view of the auger flap in a closed position against the outlet end of the auger tube when no combustible material is being pushed through by the auger.
Figure 8B:
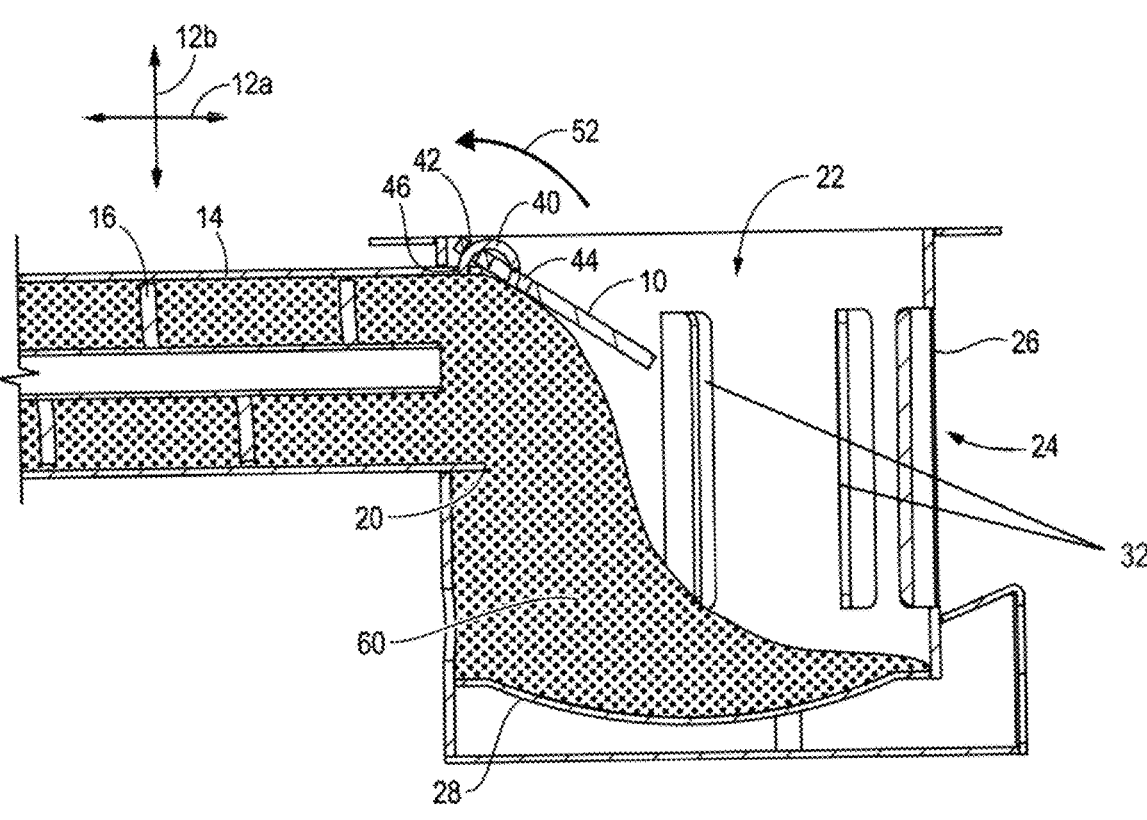
FIG. 8B is a detailed cross-sectional view of the auger flap in an open position, allowing the combustible material to be discharged into the burn box from the auger tube.

FIGS. 8A and 8B illustrate the operation of the auger flap 10. Referring specifically to FIG. 8A, when the auger 16 is not rotating and urging combustible material through the tube 14, the auger flap 10 is suspended from the loop 40 and compelled by gravity to lay substantially flat (e.g., within 2 degrees of flat) against the outlet end 20 of the tube 14.

Referring specifically to FIG. 8B, when combustible material 60 is forced by the auger 16 through the tube 14 into the inner volume 22 of the burn box 24, the combustible material 60 will force the auger flap 10 to pivot about the direction 52 and allow the combustible material 60 to fall from the outlet end 20 onto the bottom wall 28, where the combustible material 60 will be ignited by currently burning combustible material or an igniter. In some embodiments, the loop 40 itself may pivot upward slightly within the opening 46. Pivoting of the auger flap 10 may include the openings 42, 44 sliding along the loop 40, with the combined openings 42, 44 and the offset therebetween maintaining the auger flap 10 within a narrow range of motion (e.g., less than 5, less than 2, or less than 1 percent of the diameter of the tube 14) in the horizontal direction 12c.

When the auger 16 stops moving or combustible material 60 is no longer being forced through the tube 14 and any combustible material at the outlet end 20 has fallen into the inner volume 22, the auger flap 10 will be compelled by gravity to fall back to the position shown in FIG. 8A. The combined openings 42, 44 and the offset therebetween help guide the auger flap 10 back into the position of FIG. 8A rather than becoming stuck in some other position.

Figure 9:
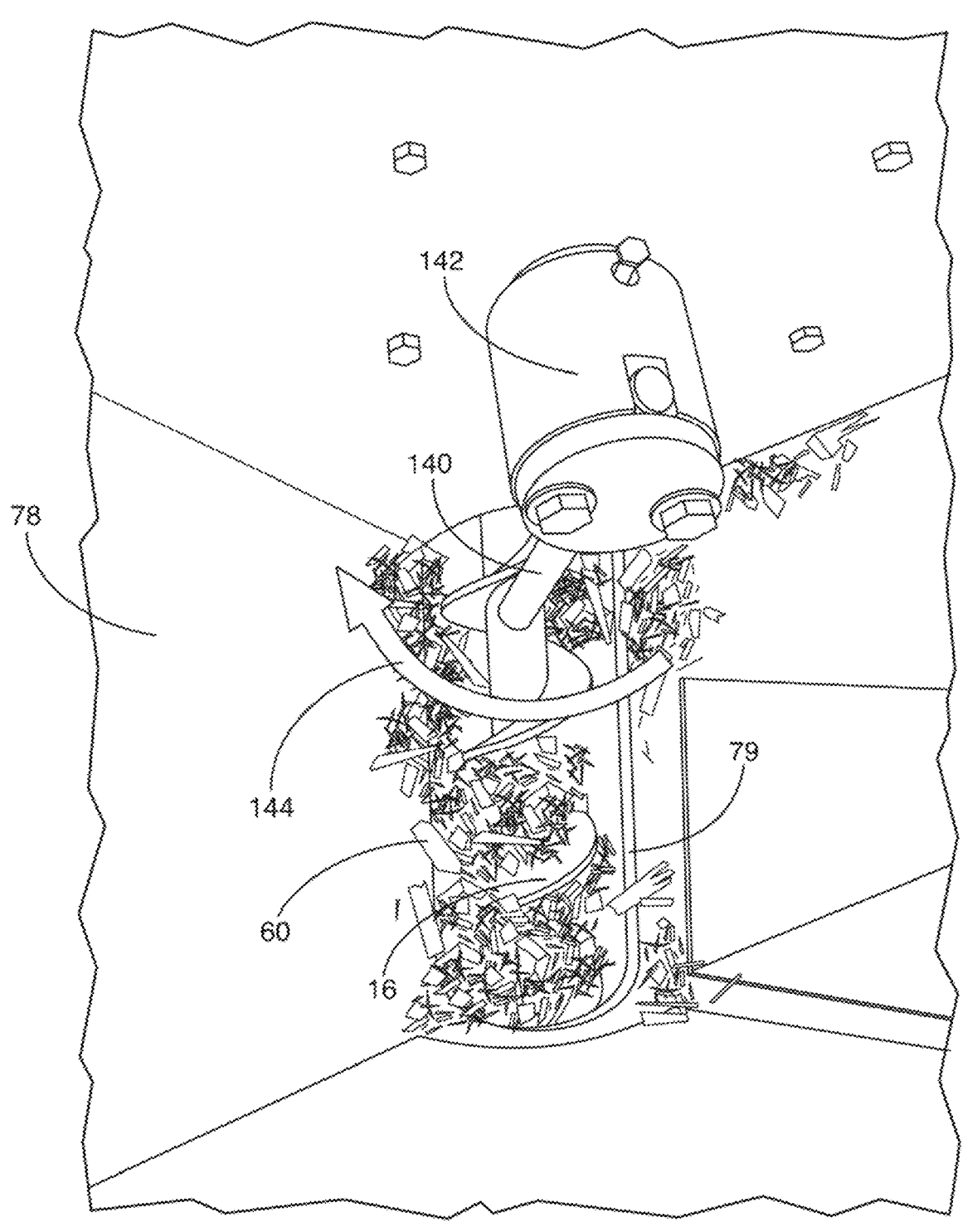
FIG. 9 is a perspective view of the clearing mechanism within the hopper, illustrating the rotating pins designed to prevent the bridging of combustible material above the auger.

Referring to FIG. 9, when using irregularly sized and shaped combustible material 60, it is possible for the combustible material 60 to "bridge" above the auger 16. The combustible material may interlock to form a bridge above the auger 16 such that combustible material 60 no longer engages the auger 16 and is not fed through the tube 14. To prevent bridging, a clearing mechanism may be used. In the illustrated embodiment, the clearing mechanism is one or more pins 140 that rotate over an opening 79 at the bottom of the hopper 78 through which the combustible material engages the auger 16 and enters the tube 14. The pin 140 may be connected to a clearing shaft 142 that rotates about an axis of rotation substantially (e.g., within 5 degrees of) parallel to the axis of rotation of the auger 16. The pin 140 may be cylindrical and orientated substantially (e.g., within 5 degrees of) perpendicular to the axis of rotation of the clearing shaft 142. The clearing shaft 142 may be driven by the motor 80 (see FIG. 2) through one or more gears and may rotate at a same or different speed from the auger 16. Alternatively, a separate motor (not shown) may drive the clearing shaft 142. A distal end of the pin 140 may traverse a path 144 over the opening 79. The path 144 may pass within 0.25, 0.125, or within 0.0625 inches of the auger 16. The distance between the axis of rotation of the clearing shaft 142 and the distal end of the pin 140 may be between 2 and 8 times the diameter 132 of the auger. However, smaller or larger distances may also be used.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A device for delivering and burning combustible material, comprising:
   a hopper;
   a burn box to receive and burn the combustible material;
   an auger tube through which the combustible material is moved from the hopper to the burn box;
   a motor;

an auger pivotably connected within the auger tube and configured to provide axial flexibility to facilitate adjustment of the auger's orientation within the auger tube in response to irregularly sized or shaped combustible material; and
   a cover flap pivotally mounted at an outlet end of the auger tube to cover the outlet end to allow combustible material to exit the outlet end when the auger is rotating with combustible material in the auger tube, further comprising a loop extending through at least two openings in the cover flap, the loop being attached to the auger tube or the burn box, wherein the cover flap is constrained to pivot around the loop in a path that is substantially parallel to the longitudinal direction of the auger tube.

2. The device of claim 1, wherein:
   the motor includes a drive shaft having an axis of rotation; and
   the auger is pivotably connected to the drive shaft to allow the auger to pivot relative to the drive shaft about an axis substantially perpendicular to the axis of rotation of the drive shaft.

3. The device of claim 1, wherein the cover flap lays flat against the outlet end under the force of gravity when the auger is not rotating, thereby preventing combustion gases from escaping into the auger tube, and pivots open when the combustible material is forced through the auger tube by the rotating auger.

4. The device of claim 1, wherein the diameter of the auger tube is substantially larger than the diameter of the auger.

5. The device of claim 1, further comprising at least one pin rotatably mounted over an opening through which combustible material engages the auger, the at least one pin being oriented substantially perpendicular to the axis of rotation of the auger.

6. An apparatus for delivering and burning combustible material, comprising:
   a hopper to store combustible material;
   a burn box having an inner volume defined by a sidewall and a bottom wall capable of burning combustible material;
   an auger tube having an inlet end in communication with the hopper and an outlet end in communication with the burn box, the auger tube suitable for transporting combustible material from the hopper to the burn box;
   a motor configured to drive the auger, the motor having a drive shaft with an axis of rotation;
   an auger positioned within the auger tube, the auger being rotatable about a longitudinal axis to facilitate movement of the combustible material through the auger tube, wherein the auger is pivotably connected within the auger tube and configured to provide axial flexibility to facilitate adjustment of the auger's orientation within the auger tube in response to irregularly sized or shaped combustible material; and
   a cover flap pivotally mounted at the outlet end of the auger tube to cover the outlet end to allow combustible material to exit the outlet end when the auger is rotating with combustible material in the auger tube, further comprising a loop extending through at least two openings in the cover flap, the loop being attached to the auger tube or the burn box, wherein the cover flap is constrained to pivot around the loop in a path that is substantially parallel to the longitudinal direction of the auger tube.

7. The apparatus of claim 6, wherein the auger pivots relative to the drive shaft about an axis that is substantially perpendicular to the axis of rotation of the drive shaft.

8. The apparatus of claim 6, wherein the cover flap lays flat against the outlet end under the force of gravity when the auger is not rotating, thereby preventing combustion gases from escaping into the auger tube, and pivots open when the combustible material is forced through the auger tube by the rotating auger.

9. The apparatus of claim 6, wherein the diameter of the auger tube is substantially larger than the diameter of the auger.

10. The apparatus of claim 6, further comprising at least one pin rotatably mounted over an opening through which combustible material engages the auger, the at least one pin being oriented substantially perpendicular to the axis of rotation of the auger.

11. A system for delivering and burning combustible material in a cooking appliance, comprising:

a hopper to store combustible material;

an auger tube having an inlet end in communication with the hopper and an outlet end, the auger tube facilitating transport of combustible material from the hopper to the outlet end;

an auger positioned within the auger tube, the auger being rotatable about a longitudinal axis to move the combustible material through the auger tube;

a burn box having an inner volume defined by a sidewall and a bottom wall, the burn box receives and burns combustible material delivered from the auger tube;

a motor with a drive shaft having an axis of rotation;

a pivotable coupling connecting the auger to the drive shaft of the motor, the pivotable coupling enabling the auger to pivot relative to the drive shaft about an axis that is substantially perpendicular to the axis of rotation of the drive shaft and configured to provide axial flexibility, wherein the auger can pivot within the auger tube in response to irregularly sized or shaped combustible material; and a cover flap pivotally mounted at an outlet end of the auger tube to cover the outlet end to allow combustible material to exit the outlet end when the auger is rotating with combustible material in the auger tube, further comprising a loop extending through at least two openings in the cover flap, the loop being attached to the auger tube or the burn box, wherein the cover flap is constrained to pivot around the loop in a path that is substantially parallel to the longitudinal direction of the auger tube.

12. The system of claim 11, wherein the cover flap lays flat against the outlet end under the force of gravity when the auger is not rotating, thereby preventing combustion gases from escaping into the auger tube, and pivots open when the combustible material is forced through the auger tube by the rotating auger.

13. The system of claim 11, wherein the diameter of the auger tube is substantially larger than the diameter of the auger.

14. The device of claim 11, further comprising at least one pin rotatably mounted over an opening through which combustible material engages the auger, the at least one pin being oriented substantially perpendicular to the axis of rotation of the auger.

15. A device for delivering and burning combustible material, comprising:

a hopper;

a burn box to receive and burn the combustible material;

an auger tube through which the combustible material is moved from the hopper to the burn box;

a motor; and an auger pivotably connected within the auger tube and configured to provide axial flexibility to facilitate adjustment of the auger's orientation within the auger tube in response to irregularly sized or shaped combustible material, wherein the auger is pivotably connected within the auger tube via a spring wound in the same direction as the rotation of the auger, concentrically connected between the auger and the motor.

16. An apparatus for delivering and burning combustible material, comprising:

a hopper to store combustible material;

a burn box having an inner volume defined by a sidewall and a bottom wall capable of burning combustible material;

an auger tube having an inlet end in communication with the hopper and an outlet end in communication with the burn box, the auger tube suitable for transporting combustible material from the hopper to the burn box;

a motor configured to drive the auger, the motor having a drive shaft with an axis of rotation; and an auger positioned within the auger tube, the auger being rotatable about a longitudinal axis to facilitate movement of the combustible material through the auger tube, wherein the auger is pivotably connected within the auger tube via a spring wound in the same direction as the rotation of the auger, concentrically connected between the auger and the motor, and configured to provide axial flexibility to facilitate adjustment of the auger's orientation within the auger tube in response to irregularly sized or shaped combustible material.

17. A system for delivering and burning combustible material in a cooking appliance, comprising:

a hopper to store combustible material;

an auger tube having an inlet end in communication with the hopper and an outlet end, the auger tube facilitating transport of combustible material from the hopper to the outlet end;

an auger positioned within the auger tube, the auger being rotatable about a longitudinal axis to move the combustible material through the auger tube;

a burn box having an inner volume defined by a sidewall and a bottom wall, the burn box receives and burns combustible material delivered from the auger tube;

a motor with a drive shaft having an axis of rotation; and a spring wound in the same direction as the rotation of the auger, concentrically connected between the auger and the drive shaft of the motor, the spring configured to enable the auger to pivot relative to the drive shaft about an axis that is substantially perpendicular to the axis of rotation of the drive shaft and to provide axial flexibility, wherein the auger can pivot within the auger tube in response to irregularly sized or shaped combustible material.

18. A device for delivering and burning combustible material, comprising:

a hopper;

a burn box to receive and burn the combustible material;

an auger tube through which the combustible material is moved from the hopper to the burn box;

a motor;

an auger pivotably connected within the auger tube to facilitate adjustment of the auger's orientation within the auger tube in response to irregularly sized or shaped combustible material; and a cover flap pivotally mounted at an outlet end of the auger tube to cover the outlet end to allow combustible material to exit the outlet end when the auger is rotating with combustible material in the auger tube, further comprising a loop extending through at least two openings in the cover flap, the loop being attached to the auger tube or the burn box, wherein the cover flap is constrained to pivot around the loop in a path that is substantially parallel to the longitudinal direction of the auger tube.

19. A device for delivering and burning combustible material, comprising:

a hopper;

a burn box to receive and burn the combustible material;

an auger tube through which the combustible material is moved from the hopper to the burn box;

a motor; and an auger pivotably connected within the auger tube to facilitate adjustment of the auger's orientation within the auger tube in response to irregularly sized or shaped combustible material, wherein the auger is pivotably connected within the auger tube via a spring wound in the same direction as the rotation of the auger, concentrically connected between the auger and the motor.

20. The device of claim 19, further comprising at least one pin rotatably mounted over an opening through which combustible material engages the auger, the at least one pin being oriented substantially perpendicular to the axis of rotation of the auger.

21. The device of claim 15, further comprising at least one pin rotatably mounted over an opening through which combustible material engages the auger, the at least one pin being oriented substantially perpendicular to the axis of rotation of the auger.

22. The apparatus of claim 16, further comprising at least one pin rotatably mounted over an opening through which combustible material engages the auger, the at least one pin being oriented substantially perpendicular to the axis of rotation of the auger.

23. The system of claim 17, further comprising at least one pin rotatably mounted over an opening through which combustible material engages the auger, the at least one pin being oriented substantially perpendicular to the axis of rotation of the auger.

24. The device of claim 18, further comprising at least one pin rotatably mounted over an opening through which combustible material engages the auger, the at least one pin being oriented substantially perpendicular to the axis of rotation of the auger.

* * * * *